3,299,671
DEVICES FOR DAMPING ANGULAR VELOCITY FLUCTUATIONS BETWEEN TWO ROTATING COMPONENTS, ONE OF WHICH DRIVES THE OTHER
Gaëtan de Coye de Castelet, Billancourt, France, assignor to Regie Nationale des Usines Renault, Billancourt, France, French works under the control and the authority of the French Government
Filed Dec. 28, 1964, Ser. No. 421,346
Claims priority, application France, Jan. 9, 1964, 959,778, Patent 1,389,604
7 Claims. (Cl. 64—27)

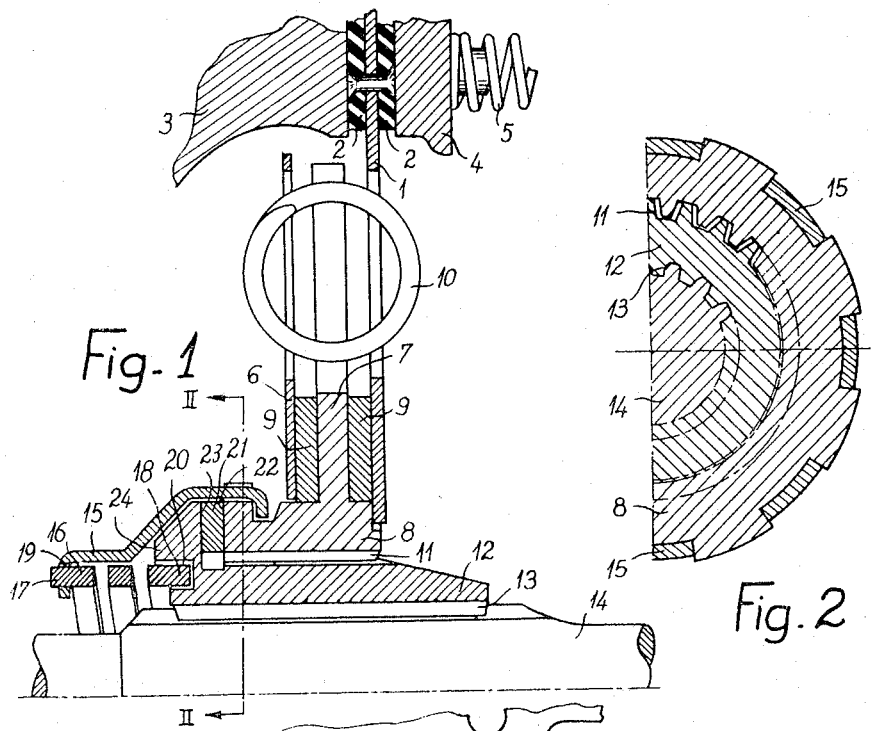
Fig. 1
Fig. 2
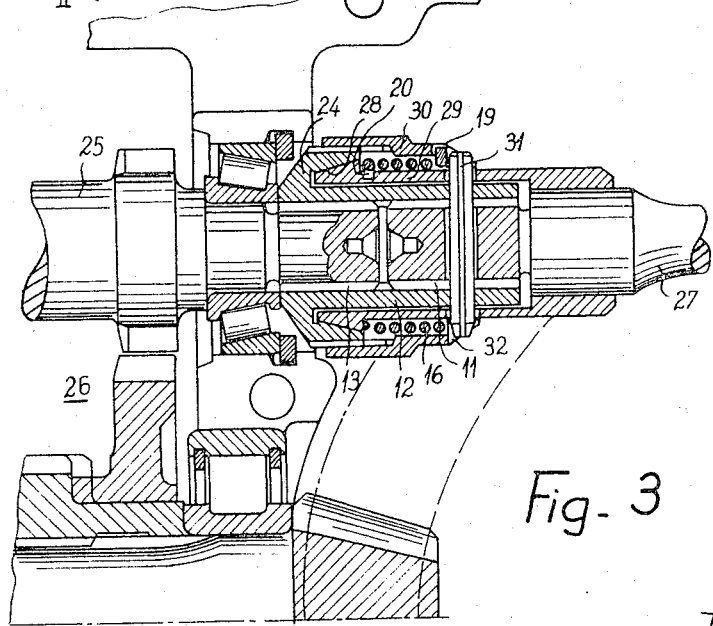
Fig. 3
Inventor
Gaëtan De Coye De Castelet
By Stevens, Davis, Miller & Mosher
Attorneys United States Patent Office 3,299,671
Patented Jan. 24, 1967

This invention relates to a device for damping angular velocity fluctuations between two rotating components, one of which drives the other, and, more particularly, to such a device mounted between the driven member of a mechanical clutch and the drive shaft of a motor-vehicle gearbox, which device becomes operative when the torque transmitted between the driven member and the drive shaft is low or practically zero.

The subject device of the invention has for its object to render uniform the angular velocity of a driven shaft rotated by a rotating member which is in turn connected to a drive shaft, either rigidly, or with a degree of flexibility which is small in comparison with the torque to be transmitted.

In the case of automobile engineering in particular, the aim in practice is to render uniform the angular velocity of a driven shaft, not only when the engine power is being transmitted to the wheels of the vehicle, but above all when the gear-change mechanism is in neutral and the engine drives, through the clutch, those components of the gear-change mechanism which are uncoupled from the wheels.

The use of engines with increasingly higher compression ratios results, at idling speeds, in notable angular velocity fluctuations in the engine flywheel, which the latter in turn transmits through the clutch to the constant-mesh gearbox components, and particularly to the pinions mounted on the different shafts. By reason of the clearances indispensable to operation of this mechanism, slap occurs between the free components which tend to rotate uniformly by virtue of their inertia and the components which are directly connected to rotation of the engine. This slapping noise is commonly known as "neutral noise," and it is the object of the present invention to suppress it.

Although this device is of particular advantage when used on a motor vehicle, it is manifest that it may also find application in other machines, such as certain machine tools, for example, wherever the problem of irregular rotation speeds arises.

A device according to the invention for damping angular velocity fluctuations between a first rotating member and a second rotating member which are coaxial and of which the first drives the second, is characterized by the fact that it comprises three couplings in parallel between the two members. Compulsorily, of these three couplings, the first is a positive coupling provided with an angular backlash of a few degrees, the second a preloaded elastic coupling which continuously urges one of the members into a given direction of rotation relative to the other, and the third a friction-type torque limiter acting as a damper.

The positive coupling may be formed by a splined coupling, and the value of the angular backlash must be adapted to the angular velocity fluctuations of the drive shaft and to the design of the driven shaft.

The elastic coupling is preferably a coil spring the axis of which coincides with that of the rotating members and the two ends of which are so fixed respectively to the two members that one extremity be angularly rigid with one of said members and the other extremity with the other member. The advantage of this solution is that it enables the same spring to be used to urge the two friction elements of the torque limiter against each other.

The present invention likewise includes other constructional features which will emerge from the description which follows of two possible forms of embodiment of the subject damping device for use in motor vehicle transmissions, given with reference to the accompanying non-limitative exemplary drawing, in which:

FIGURE 1 shows in schematic section a device according to the invention incorporated in a mechanical clutch;

FIGURE 2 is a half-sectional view through the line II—II of FIGURE 1; and

FIGURE 3 shows in schematic section a device according to the invention mounted between a driven clutch shaft and a gearbox drive shaft.

Referring first to FIGURE 1 for an illustration of the conventional component parts of a disc clutch, there is shown thereon a clutch disc 1 bearing friction linings 2 and rotating between a clutch plate 3 customarily coupled to the flywheel and a movable ring 4 urged toward said clutch plate by clutch springs 5. The clutch disc 1 is rigid with a web 6. The fabric 7 of the clutch hub 8 is gripped between the disc 1 and the web 6, friction linings 9 being inserted between the fabric and the web, on one hand, and the disc, on the other. Between the fabric 7, on the one hand, and the web 6 and the disc 1, respectively, on the other, progressive-acting and tangentially orientated clutch compression springs 10 are disposed with a degree of preloading in windows or indents provided in the web, the fabric and the disc. This known system of progressive-acting springs, which forms the torsional damper of the clutch disc, gives good results when the engine is coupled to the wheels through the clutch and through a pair of pinions which are in mesh or dog-clutches in the gearbox. For a better appreciation of the system, the "overrun" torque transmitted by this damper is of the order of one-third to one-quarter the maximum engine torque, whereas, for positive drive, the full torque is transmitted through it or through the agency of abutments which operate to limit the angular stroke of the damper, the function of which at high speeds is greatly lessened by virtue of the efficiency of the flywheel in such cases.

By design and in order to avoid undesirable noise, the springs 10 are fitted with a non-negligible degree of compressive preloading; similarly, by design, the linings 9 are pressed by the webs 6 and the disc 1 against the hub 8, whereby the frictional torque thereby obtained is likewise not negligible.

The concerted effects of the preloading of the springs 10 and the friction forces developed by the linings 9 cause the torque required to shift the disc 1 and the web 6 angularly with respect to the hub 8 to be greater than the torque required, when the gearbox is in neutral, to rotate the hub 8 and all the components coupled thereto in the gear-change mechanism, the latter being rotationally segregated from the wheels.

As a result, when the gearbox is in neutral, the angular velocity fluctuations of the drive shaft driving the disc 1 are faithfully followed by the clutch shaft, which is customarily directly coupled to the hub 8 through splines, which classic design is not shown.

In the clutch shown in FIGURE 1, this direct coupling is replaced by the subject device of the invention. The latter includes a first rotating member consisting of the hub 8 mounted through splines 11 on a second rotating member 12 shaped as an internally and externally splined sleeve which is mounted through splines 13 on the driven clutch shaft 14. The splines 11, which represent the positive coupling of the device, are mutually engaged with a large angular backlash of the order of five to fifteen degrees, say, and the splines 13 are engaged with the customary minimum clearance compatible with assembly requirements and normal operating conditions.

The hub 8 and the second member 12, however, cannot move relatively to each other with complete freedom, for a cap 15 engaging over and rigidly united with the hub 8 (see FIGURES 1 and 2) acts as a thrust means for a spring 16 working in torsion and in compression. This spring works in torsion due to the fact that its ends 17 and 18 are engaged in notches or housings 19 and 20 provided, respectively, in the bottom of the cap 15 and in the second member 12, and said spring works in compression between said cap bottom and said member.

The degree of compression of spring 16 governs the degree to which a friction lining 21 is compressed between the end surface 22 of hub 8 and an associated parallel surface 23 facing the surface 22 and provided on a flange 24 terminating one of the extremities of the second member 12.

In this constructional form, the spring 16 working in torsion acts as an elastic coupling, and the lining 21 clamped by the spring between the surfaces 22 and 23 as a torque limiter. The rotational freedom or preloading of the spring 16 imparted thereto, on assembly, by angularly offsetting the notches 19 and 20 determines the opposing torque generated during the angular travel authorized by the clearance in the splines 11. The cross-section of the spring wire, the spring coil diameter and the number of turns in the spring jointly determine the flexibility of the elastic coupling provided between the hub 8 and the second member 12, within the angular limits permitted by the clearance in the splines 11. The designer can thus readily impart the desired degree of flexibility and damping for suppressing "neutral noise" by smoothing out excessive angular velocity fluctuations of the engine shaft.

The illustrated constructional form of this device is very compact and introduces no complications in the adjacent mechanisms, nor any loss of overall compactness in the usual powerplant components. If desired, however, the device may be transferred to a different location, an example being between the driven clutch shaft and the drive shaft of the gearbox.

Such a disposition is shown in FIGURE 3.

The drive shaft 25 of a geabox 26 carries on its end projecting from the gearbox the second rotating member 12 of the subject damping device of the invention. Splines 13 provide the coupling between this shaft end and said second member. The internally splined part of the second member 12 is extended beyond said shaft end and coupled through splines 11 to the driven shaft 27 of a clutch (not shown). As in the precedingly described form of embodiment, the splines 11 providing the positive coupling engage with large angular backlash and the splines 13 with the customary minimum clearance provided for splined couplings.

The second member bears on its gearbox end a flanged portion 24 having formed thereon a conical friction surface 28 which cooperates with a matching friction surface provided on one extermity of the first rotating member, which member is shaped as a sleeve 29. The latter is a force fit on the clutch driven shaft 27 and loosely caps, i.e., with a clearance, the second rotating member 12. The sleeve 29 comprises adjacent said flanged portion a radial housing 20 for one of the ends of a coil spring 16 which surrounds the sleeve 29 and the other end of which engages in an indent 19 formed at one extremity of a ring 30. The other extremity of the ring 30 is tapped and screwed onto a threaded portion of the flanged piece 24.

A linchpin 31 extends, with an angular clearance equal to or greater than that of the splines 11, through the clutch driven shaft 27 and the sleeve 29, on the one hand, and, without clearance, through the second member 12 and the two indents 32 of a castellated portion of the ring 30 formed on that extremity thereof which comprises the indent 19, on the other hand. The purpose of this linchpin 31 is to lock the tapped ring 30 in order to avoid possible loosening thereof, though it is to be noted that the screw thread is such that the ring be applied hard against the sides of its screw threads by elasticity, this being obtained in any convenient manner by providing local slots (not shown) on the tapped portion of the ring, the machining of which ring would, in the absence of said slots, result in an otherwise tight screw thread.

Manifestly, the ring 30 may be replaced by a sleeve rigidly united with the flanged piece 24, the required damping conditions being established once and for all in the event of quantity production.

As with the form of embodiment described with reference to FIGURES 1 and 2, the spring 16 working in torsion acts as the elastic coupling, and the conical friction surface 28 applied against the matching surface by the spring as a torque limiter.

In the constructional form of FIGURE 3, the manner of functioning of the various component parts described is identical to that of the corresponding parts of the device illustrated in FIGURES 1 and 2.

I claim:

1. A device for damping angular velocity fluctuations between a first rotating member and a second rotating member which are coaxial, in which said first member drives said second member, said device comprising three parallel couplings provided between said two members, the first of said couplings being in the form of mutually engageable splines provided with an angular backlash of a few degrees; the second of said couplings being in the form of a pre-loaded coil spring, the axis of which coincides with that of said rotating members and the two ends of which are so fixed respectively to said two members that one extremity be angularly rigid with one of said members and the other extremity with the other member to continuously urge one of said members into a given direction of rotation relative to the other; the third coupling being in the form of a friction-type torque limiter which comprises two facing parallel circular surfaces, one of said surfaces being provided on the extremity of said first member and the other on a flanged portion of said second member, and friction means extending between said two surfaces; said coil spring urging said surfaces towards each other.

2. A damping device according to claim 1, wherein the spring of said elastic coupling is so mounted that it urges the surfaces of said torque limiter against each other.

3. A damping device according to claim 1, wherein said second rotating member is mounted through splines on the driven shaft of a motor vehicle disc clutch, said shaft being angularly rigid with the drive shaft of a gearbox, and said first member which is mounted through splines on said second member being the clutch hub, which hub is provided with a fabric and has mounted thereon a clutch disc having a certain degree of angular backlash and progressive-acting clutch springs disposed between said fabric and said clutch disc while a cap having its edge rigidly secured to said clutch hub covers one extremity of said two rotating members and maintains said coil spring compressed between its bottom and the extremity of said second member, one end of said spring being engaged in said cap and the other in said second member in such manner as to be angularly rigid with said cap and said second member respectively.

4. A damping device according to claim 3, wherein said parallel circular surfaces are positioned within said cap, and wherein said friction means is in the form of a friction lining inserted between said two surfaces.

5. A damping device according to claim 3, wherein said two facing parallel circular surfaces are positioned within said cap.

6. A damping device according to claim 1, wherein said second member is mounted through splines, on the one hand on the drive shaft of a motor vehicle gearbox, and, on the other, with said backlash of a few degrees, on the driven shaft of the motor vehicle clutch, which driven shaft has rigidly mounted thereon said first member which is formed as a sleeve which caps said second member and the extremity of which has formed thereon one of the torque limiter friction surfaces which said coil spring maintains applied against a matching annular friction surface provided on a flanged portion of said second member, said coil spring surrounding said sleeve and being compressed between two abutments or ridged portions, one of which is provided on said sleeve and the other inside a tapped ring screwed onto said flanged portion, and said coil spring having one extremity engaged in said first member and the other in said tapped ring whereby to be rendered angularly rigid with said first member and with said tapped ring respectively, which ring is locked to said flanged portion with locking means such as a linchpin.

7. A damping device according to claim 1, wherein said angular backlash is of the order of five to fifteen degrees and is adapted to suit the angular velocity fluctuations of the first rotating member and the design of the second rotating member.

References Cited by the Examiner

UNITED STATES PATENTS

| 1,659,311 | 2/1928 | Candee | 64—27 |
| 1,716,284 | 6/1929 | Risley | 64—1 |
| 1,979,146 | 10/1934 | Davey | 64—15 X |
| 2,042,570 | 6/1936 | Wemp | 64—27 |
| 2,745,268 | 5/1956 | Reed | 64—27 |
| 3,223,214 | 12/1965 | Kuivinen | 64—27 |

FRED C. MATTERN, Jr., *Primary Examiner.*

HALL C. COE, *Examiner.*